United States Patent [19]

Talak

[11] 3,913,831
[45] Oct. 21, 1975

[54] OIL COOLER BYPASS VALVE

[75] Inventor: John Frank Talak, Dubuque, Iowa

[73] Assignee: Deere & Company, Moline, Ill.

[22] Filed: Mar. 22, 1974

[21] Appl. No.: 453,092

[52] U.S. Cl. ............ 236/34.5; 236/101; 137/625.29
[51] Int. Cl.² ............................................. F01P 1/02
[58] Field of Search ............. 236/93, 34.5, 99, 101;
165/35, 40; 123/196 AB; 184/104 B;
137/625.29

[56] References Cited
UNITED STATES PATENTS

| | | | |
|---|---|---|---|
| 2,896,919 | 7/1959 | Teague, Jr. .................. | 236/34.5 X |
| 3,273,796 | 9/1966 | Bauerlein ..................... | 236/93 X |
| 3,300,135 | 1/1967 | Slater et al. .................. | 236/34.5 |
| 3,472,214 | 10/1969 | Moon ............................ | 236/93 X |
| 3,506,192 | 4/1970 | Otto ............................. | 236/34.5 |

*Primary Examiner*—William E. Wayner
*Assistant Examiner*—William E. Tapolcai, Jr.

[57] ABSTRACT

A spool-type bypass valve is provided for controlling the flow of oil either to a circuit including an oil cooler or to a circuit bypassing the oil cooler. The valve includes an axially shiftable valve spool which is normally operated by an axially extendible and retractable thermostatic element which is in fluid communication with fluid upstream from the cooler and responsive to the temperature thereof to shift the valve spool between first and second positions for respectively directing fluid to the cooler circuit or to a reservoir. A pilot pressure circuit is connected to the valve spool to act in opposition to the thermostatic element so as to override the latter to cause fluid to be directed to the reservoir when the pressure of the fluid upstream from the cooler reaches an abnormally high value indicative of a condition such as would occur in the event that the oil cooler circuit became clogged.

2 Claims, 1 Drawing Figure

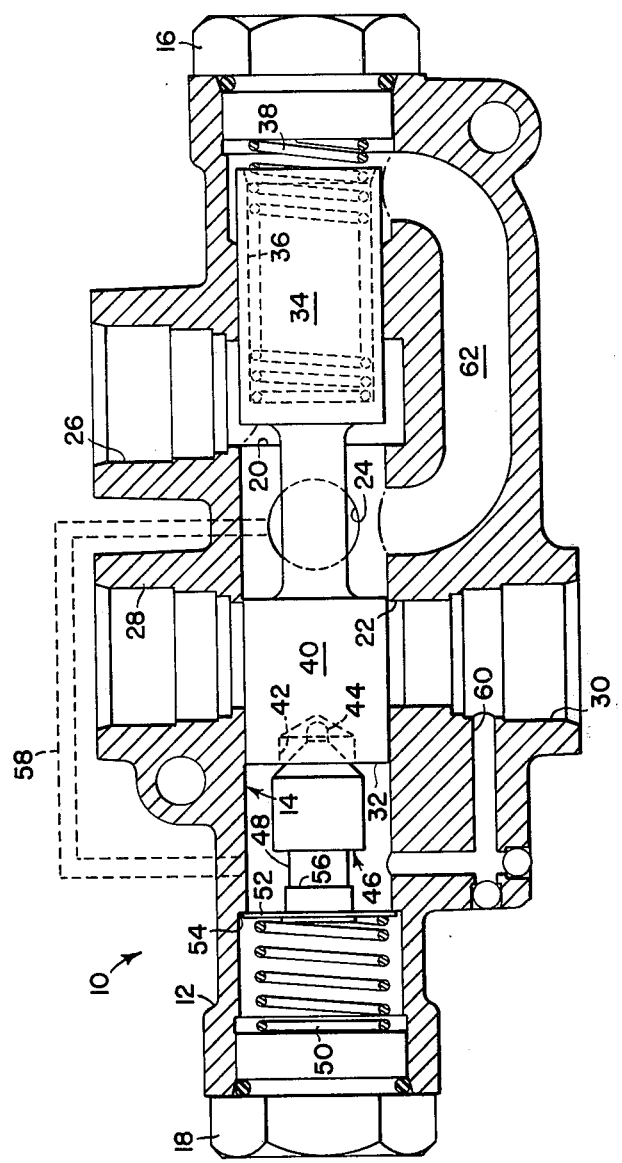

OIL COOLER BYPASS VALVE

BACKGROUND OF THE INVENTION

The present invention relates to a thermostatically controlled valve and more specifically relates to an oil cooler bypass valve.

It is conventional on vehicles today to provide many functions controlled by pressurized hydraulic fluid or oil. As this oil performs its work, it becomes heated and in order to prevent the oil from being heated to the extent that it breaks down or changes in viscosity to the extent that it becomes unsuitable for performing the desired work, the vehicles are provided with oil coolers. To ensure quick warmup of the oil and to maintain the oil at a predetermined temperature, oil cooler bypass valves are known in the art which direct the oil to a circuit bypassing the oil cooler when the temperature of the fluid is below a predetermined desired temperature.

SUMMARY OF THE INVENTION

According to the present invention, there is provided a novel oil cooler bypass valve.

An object of the invention is to provide a bypass valve of the spool valve type wherein all of the shiftable elements of the valve are in axial alignment and include an axially extensible and retractable thermostatic element which bears against and actuates an axially shiftable valve spool.

Another object is to provide a bypass valve which is both temperature responsive and pressure responsive, the pressure-responsive part of the valve overriding the temperature-responsive part.

Specifically, in conjunction with the object set forth in the preceding paragraph, it is an object to provide a relatively stiff first spring for holding the thermostatic element in a normal operating position in the valve bore and to provide a softer spring for acting on one end of the valve spool to engage its other end with the thermostatic element and to interconnect an inlet port of the valve to that end of the spool which is remote from the thermostatic element.

These and other objects will become more apparent from a reading of the following description in conjunction with the drawings.

BRIEF DESCRIPTION OF THE DRAWING

The sole FIGURE is a longitudinal sectional view taken through an oil cooler bypass valve constructed according to the principles of the present invention.

DESCRIPTION OF THE PREFERRED EMBODIMENT

Referring now to the drawing, therein is shown an oil cooler bypass valve indicated in its entirety by the reference numeral 10. The valve 10 comprises the valve body 12 in which is located a valve bore 14 having right and left ends respectively closed by end caps 16 and 18. Formed in a central portion of the valve bore 14 are right and left axially spaced annular recesses 20 and 22. Intersecting the bore at a location between the recesses 20 and 22 is an inlet port 24 and connected directly to the right annular recess 20 is an outlet port 26 and connected directly to the left annular recess 22 are return and sump ports 28 and 30, respectively, the return port appearing in the drawing at a location above and diametrically opposite from the sump port 30. The inlet, outlet, return and sump ports 24, 26, 28 and 30 are respectively adapted for connection to the outlet of an oil-operated vehicle function, to the inlet of an oil cooler, to the outlet of the oil cooler and to a reservoir.

Axially shiftably mounted in the valve bore 14 for the purpose of selectively connecting the inlet port 24 either to one or the other or both of the outlet and sump ports 26 and 30 is a valve spool 32. A tubular land 34 at the right end of the spool forms a receptacle 36 in which is located a coil compression spring 38 having its opposite ends engaged against the spool 32 and the bore end cap 16. At the opposite end of the spool 32 from the tubular land 34 is a land 40. An axial recess 42 is formed in the left end of the valve spool 32 and serves to support a tapered end portion of and which contains an axially shiftable piston 44 of a thermostatic temperature sensor or thermostatic element 46. The thermostatic element 46 includes a further section 48, and a coil compression spring 50 acts between the left end cap 18 and a disc-like left end 52 of the section 48 and acts to seat the end 52 against a leftwardly facing shoulder 54 of the valve bore 14. It is here pointed out that the coil compression spring 50 is stiffer than the spring 38 and thus normally maintains the section 48 of the thermostatic element 46 in an operative position, as shown in the drawing, while the coil compression spring 38 serves to keep the valve spool 32 engaged against the shiftable piston 44 of the element 46. The thermostatic element 46 is illustrated in a fully extended condition wherein the axially shiftable piston is shifted rightwardly on the section 48 from a shoulder 56, the element 46 holding the valve spool 32 in a shifted position wherein the land 40 blocks fluid communication between the inlet and sump ports 24 and 30 while the left end of the tubular land 34 is located in the right annular recess 20 and permits the flow of fluid between the inlet and outlet ports 24 and 26. The condition of the thermostatic element 46 illustrated in the drawing is that which it would assume when the temperature of the fluid therearound reaches or is above a predetermined temperature.

To ensure that the thermostatic element 46 senses the temperature of the fluid at the inlet port 24, the port is connected to the bore at a location adjacent the element 46 through means of a small diameter passage indicated here by the dashed lines at 58. A second small diameter passage 60 cooperates with the passage 58 to ensure circulation of the fluid past the element 46 and for this purpose has opposite ends respectively connected to the bore 14 adjacent the element 46 and to the sump port 30.

A pilot fluid passage 62 interconnects a location of the bore adjacent the inlet port 24 with a location of the bore which is in constant fluid communication with the right end of the valve spool 32. The purpose of the pilot fluid passage 62 is to expose the right end of the valve spool 32 to the fluid pressure which exists at the inlet port 24 so that in the event that the circuit downstream from the outlet port 26 becomes clogged when the thermostatic element 46 is extended, the pressure will act to shift the spool 32 leftwardly to connect the inlet port 24 to the sump port 30 thus bypassing the cooler circuit.

The operation of the valve 10 is as follows. Assuming that the thermostatic element 46 is fully extended, as shown in the drawing, as it will be when the oil is up to full predetermined temperature, the valve spool 32 will be in its right-most position as shown and the main of the fluid entering the left port 24 will be directed to the cooler by way of the outlet port 26, it being noted that the land 40 blocks fluid communication between the inlet and sump ports 24 and 30. The small diameter passages 58 and 60 will serve to permit a small amount of flow to pass from the inlet port 24 to the bore 14 in the vicinity of the thermostatic element 46 and then to the sump port 30 without going to the cooler, this small amount of flow ensuring that the thermostatic element 46 is sensing the temperature of the fluid as it flows from a fluid controlled element of the vehicle. Under ordinary operating pressures, the unbalanced pressure on the spool 32 due to the pressure at the inlet port 24 being connected to the right end of the spool 32 will be insufficient to overcome the resistance offered by the coil compression spring 50. In the event that the circuit downstream from the outlet port 26 should become clogged or otherwise restricted, a back pressure will build up and this pressure will be conveyed by the passage 62 to the right end of the valve spool 42 causing the latter to shift leftwardly sufficiently far to permit fluid to flow directly from the inlet port 24 to the sump port 30. Thus, a pressure relief is provided in case the oil cooler circuit should ever become clogged.

During the time before the oil is heated to the predetermined temperature, as when the vehicle is just beginning operation, the thermostatic element 46 will be in a completely retracted condition. When the element 46 is in such a retracted condition, the coil compression spring 38 acting on the right end of the valve spool 32 will hold the latter leftwardly against the element 46 and in a normal position wherein the inlet port 24 is connected to the sump port 30 while being blocked from fluid communication with the outlet port 26. Thus, fluid entering the inlet port 24 will bypass the oil cooler. As the oil gradually warms up, the thermostatic element will begin to expand at some predetermined minimum temperature. As the element 46 expands, it will shift the spool 32 rightwardly against the action of the spring 38. During the first movement of the spool, only a portion of the oil will be directed to the cooler and only when the thermostatic element 46 is fully expanded and the spool 32 is in the position shown in the drawing will all the oil be directed to the oil cooler.

I claim:

1. An oil cooler bypass valve, comprising: a valve body containing a valve bore having first and second closed ends and intersected at spaced locations by inlet, outlet, return and sump ports respectively adapted for connection to the outlet of an oil-controlled vehicle function, and oil cooler inlet, and oil cooler outlet and an oil reservoir; said inlet port being between said outlet and return ports; a valve spool axially shiftably mounted in said bore and including first and second lands at opposite ends thereof; said first land including an axial recess; an axially extendible and retractable thermostatic element normally located in an operative position in the bore adjacent said first land and including an end portion received in said recess and further including a positioning surface normally engaged with a shoulder of the bore facing axially away from the first land; a first biasing means urging said element against said shoulder; passage means connected between said inlet port and said bore at a location in fluid communication with said thermostatic element; and second biasing means exerting less force than said first biasing means and urging said valve spool toward said thermostatic element; said thermostatic element being responsive to the temperature of oil at said inlet and being in a completely retracted condition when the oil is below a predetermined first temperature and in a fully extended condition when the oil is above a predetermined second temperature higher than the first temperature, said valve spool being shifted against said second biasing means by said thermostatic element during extension of the latter and said first and second lands being so located relative to said outlet and sump ports that said inlet port is respectively blocked from said outlet port and connected in fluid communication with said sump port by a path through the bore when the thermostatic element is in its completely retracted condition, and is respectively connected in fluid communication with said outlet port by a path through the bore and blocked from fluid communication with said sump port when the thermostatic element is in its fully extended condition.

2. The oil cooler bypass valve defined in claim 1 wherein said second land has an axially opening hollow interior forming a spring receptacle and said second biasing means being a coil compression spring partially located in said hollow interior and acting between said first closed end of the bore and the valve spool.

* * * * *

UNITED STATES PATENT OFFICE
CERTIFICATE OF CORRECTION

Patent No. 3,913,831        Dated 21 October 1975

Inventor(s) John Frank Talak

It is certified that error appears in the above-identified patent and that said Letters Patent are hereby corrected as shown below:

Cover Sheet, [21] Appl. No.: change "453,092" to --453,692--.

Signed and Sealed this

Tenth Day of August 1976

[SEAL]

Attest:

RUTH C. MASON
*Attesting Officer*

C. MARSHALL DANN
*Commissioner of Patents and Trademarks*